US009555870B2

(12) United States Patent
Grimm, III

(10) Patent No.: US 9,555,870 B2
(45) Date of Patent: Jan. 31, 2017

(54) HEATING A CARGO BARGE USING RECOVERED ENERGY FROM ANOTHER VESSEL USING AN UMBILICAL

(71) Applicant: MARTIN OPERATING PARTNERSHIP LP, Kilgore, TX (US)

(72) Inventor: Edward Henry Grimm, III, Houston, TX (US)

(73) Assignee: Martin Operating Partnership L.P., Kilgore, TX (US)

( * ) Notice: Subject to any disclaimer, the term of this patent is extended or adjusted under 35 U.S.C. 154(b) by 0 days.

(21) Appl. No.: 15/090,235

(22) Filed: Apr. 4, 2016

(65) Prior Publication Data

US 2016/0214697 A1 Jul. 28, 2016

Related U.S. Application Data

(60) Division of application No. 14/174,832, filed on Feb. 6, 2014, now Pat. No. 9,302,562, which is a
(Continued)

(51) Int. Cl.
*B63J 2/12* (2006.01)
*B63J 2/14* (2006.01)
(Continued)

(52) U.S. Cl.
CPC . *B63J 2/12* (2013.01); *B60H 1/02* (2013.01); *B63B 9/04* (2013.01); *B63B 11/02* (2013.01);
(Continued)

(58) Field of Classification Search
CPC ........... B60H 1/02; B63B 35/28; B63B 25/08; B63B 25/16; B63B 21/62; B63B 9/04; B63J 2/12; B63J 2/14
(Continued)

(56) References Cited

U.S. PATENT DOCUMENTS 1,658,336 A 2/1928 Isherwood
2,359,549 A 10/1944 Epstein
(Continued)

FOREIGN PATENT DOCUMENTS

EP 267168 5/1988
EP 0459253 12/1991
(Continued)

OTHER PUBLICATIONS

John Kratochvil, "Utilizing Inland Waterway Coastal and Open Ocean Barging of Containerized Agricultural Products to Overcome Existing Service Deficiencies and Increased Transportation Costs", Final Report of Aug. 30, 2005 to Funding Agency, 50 pages.
(Continued)

*Primary Examiner* — Lars A Olson
(74) *Attorney, Agent, or Firm* — Strasburger & Price, LLP

(57) ABSTRACT

A method for heating a cargo on a watergoing vessel using an energy source (such as a heat source) on another watergoing vessel. The vessels may be underway. The energy may be transferred to the cargo via energy umbilicals configured to carry energy in a transfer fluid. The transfer fluid may be circulated in a cargo heat exchanger configured to move energy into the hot cargo. The energy source on the another watergoing vessel may be a propulsion motor, exhaust heat, or non-propulsion heat source. The method may include heating the hot cargo. The method may also include switching between heat sources when both vessels are configured to heat the hot cargo.

8 Claims, 15 Drawing Sheets

Related U.S. Application Data continuation-in-part of application No. 13/660,756, filed on Oct. 25, 2012, now Pat. No. 9,045,194, which is a continuation-in-part of application No. 13/570,762, filed on Aug. 9, 2012.

(51) Int. Cl.

| | | |
|---|---|---|
| *B60H 1/02* | (2006.01) | |
| *B63B 9/04* | (2006.01) | |
| *B63B 11/02* | (2006.01) | |
| *B63B 25/12* | (2006.01) | |
| *B63B 21/62* | (2006.01) | |
| *B63B 25/16* | (2006.01) | |
| *B63B 35/28* | (2006.01) | |
| *B63B 21/56* | (2006.01) | |

(52) U.S. Cl.
CPC .............. *B63B 21/62* (2013.01); *B63B 25/12* (2013.01); *B63B 25/16* (2013.01); *B63B 35/28* (2013.01); *B63J 2/14* (2013.01); *B63B 2021/563* (2013.01)

(58) Field of Classification Search
USPC ........................................................ 114/74 A
See application file for complete search history.

(56) References Cited

U.S. PATENT DOCUMENTS

| | | | |
|---|---|---|---|
| 2,370,916 A | 3/1945 | Reedy, Sr. | |
| 3,021,808 A | 2/1962 | Henry | |
| 3,039,418 A | 6/1962 | Versulis | |
| 3,083,668 A | 4/1963 | Marciano | |
| 3,191,568 A | 6/1965 | Schroeder | |
| 3,213,632 A | 10/1965 | Valt | |
| 3,319,431 A | 5/1967 | Clarke | |
| 3,326,167 A | 6/1967 | Paoli | |
| 3,490,639 A | 1/1970 | Gibson | |
| 3,605,425 A | 9/1971 | Cuneo | |
| 3,721,362 A | 3/1973 | Bridges | |
| 3,766,876 A | 10/1973 | Cowles | |
| 3,875,886 A | 4/1975 | Glasfeld | |
| 3,882,591 A | 5/1975 | Yamamoto | |
| 3,931,424 A | 1/1976 | Heft | |
| 3,941,272 A | 3/1976 | McLaughlin | |
| 4,230,061 A | 10/1980 | Roberts | |
| 4,269,599 A * | 5/1981 | Zhestkov | F01P 3/20 114/125 |
| 4,359,958 A | 11/1982 | Durant | |
| 4,660,491 A | 4/1987 | Murata | |
| 4,672,906 A | 6/1987 | Asai | |
| 4,744,321 A | 5/1988 | Pfeuffer | |
| 5,007,225 A | 4/1991 | Teasdale | |
| 5,176,029 A | 1/1993 | Dittrich | |
| 5,375,547 A | 12/1994 | Abe | |
| 5,398,630 A | 3/1995 | Skaarup | |
| 5,469,799 A | 11/1995 | Iwai | |
| 5,582,124 A | 12/1996 | Sikora | |
| 5,599,217 A * | 2/1997 | Ferrante | F01P 3/207 165/41 |
| 6,035,796 A | 3/2000 | Vowels | |
| 6,170,420 B1 | 1/2001 | Hagner | |
| 6,357,373 B1 | 3/2002 | Hagner | |
| 6,637,359 B1 | 10/2003 | Hagner | |
| 6,701,733 B2 * | 3/2004 | Brunner | B63J 2/04 165/41 |
| 6,708,636 B1 | 3/2004 | Hagner | |
| 6,907,836 B2 | 6/2005 | Hagner | |
| 6,984,452 B2 | 1/2006 | Kennedy | |
| 7,047,899 B2 | 5/2006 | Laurilehto | |
| 8,671,863 B2 | 3/2014 | Chen | |
| 8,770,125 B2 | 7/2014 | Guerrier | |
| 9,302,562 B2 * | 4/2016 | Grimm, III | B63J 2/12 |
| 2004/0237865 A1 | 12/2004 | Hagner | |
| 2005/0172880 A1 | 8/2005 | Laurilehto | |
| 2006/0053806 A1 | 3/2006 | Tassel | |
| 2009/0266087 A1 | 10/2009 | Adkins | |
| 2010/0083671 A1 | 4/2010 | Liner | |
| 2011/0192339 A1 | 8/2011 | Chen | |
| 2012/0097088 A1 | 4/2012 | Guerrier | |
| 2012/0137955 A1 | 6/2012 | VanTassel | |
| 2012/0324910 A1 | 12/2012 | Shete | |

FOREIGN PATENT DOCUMENTS

| | | |
|---|---|---|
| EP | 1894832 | 3/2008 |
| EP | 1914160 | 4/2008 |
| FR | 2719545 | 11/1995 |
| GB | 235397 | 6/1925 |
| GB | 2143182 | 2/1985 |
| JP | 57095288 | 6/1982 |
| JP | 4292292 | 10/1992 |
| JP | 2004330857 | 11/2004 |
| JP | 2011148358 | 8/2011 |

OTHER PUBLICATIONS

Joseph Keefe, 'The Versatile ATB Enters the LNG Game,' Maritime Report and MarineNews magazines online, MarineLink.com published Jul. 7, 2014 (4 pages).
PCT International Search Report for International Application No. PCT/US13/54109 dated Jan. 17, 2014 (2 pages).
PCT International Search Report for International Application No. PCT/US14/35787 dated Sep. 3, 2014 (2 pages).
PCT International Search Report for International Application No. PCT/US14/35919 dated Sep. 3, 2014 (2 pages).
PCT Written Opinion of the International Searching Authority for International Application No. PCT/US13/35787 dated Jan. 17, 2014 (7 pages).
PCT Written Opinion of the International Searching Authority for International Application No. PCT/US14/35787 dated Sep. 3, 2014 (5 pages).
PCT Written Opinion of the International Searching Authority for International Application No. PCT/US14/35919 dated Sep. 3, 2014 (6 pages).
Response to US Patent and Trademark Office Non-Final Office Action dated Aug. 9, 2014 filed on Oct. 9, 2014 for U.S. Appl. No. 13/570,762, filed Aug. 9. 2012 (19 pages).
Response to US Patent US Patent and Trademark Office Non-Final Office Action dated Jul. 14, 2014 filed on Jul. 31, 2014 for U.S. Appl. No. 13/570,762, filed Aug. 9, 2012 (26 pages).
US Patent and Trademark Office, Final Office Action dated Mar. 20, 2015 for U.S. Appl. No. 13/570,762, filed Aug. 9, 2012 (12 pages).
US Patent and Trademark Office, Non-Final Office Action dated Jul. 14, 2014 for U.S. Appl. No. 13/570,762, filed on Aug. 9, 2012 (11 pages).
US Patent and Trademark Office, Non-Final Office Action dated Oct. 9, 2014 for U.S. Appl. No. 13/570,762, filed Aug. 9, 2012 (21 pages).
Traco Manufacuring, Inc., "Shrink Sleeve Design Guidelines" dated Jan. 15, 2015 (3 pages).

* cited by examiner

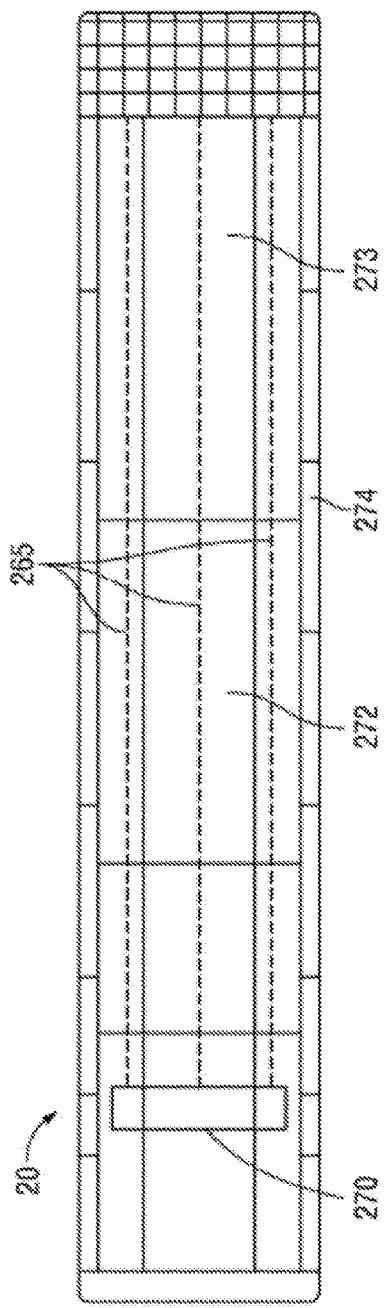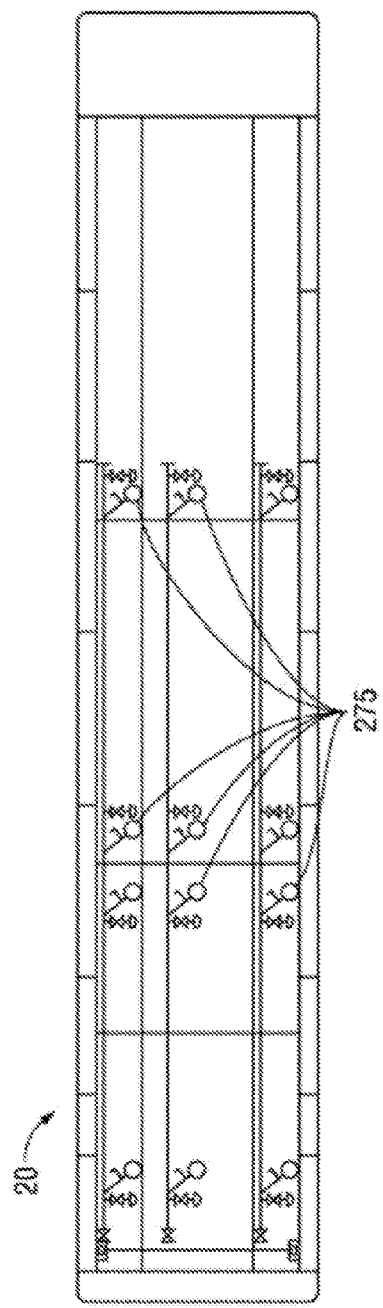

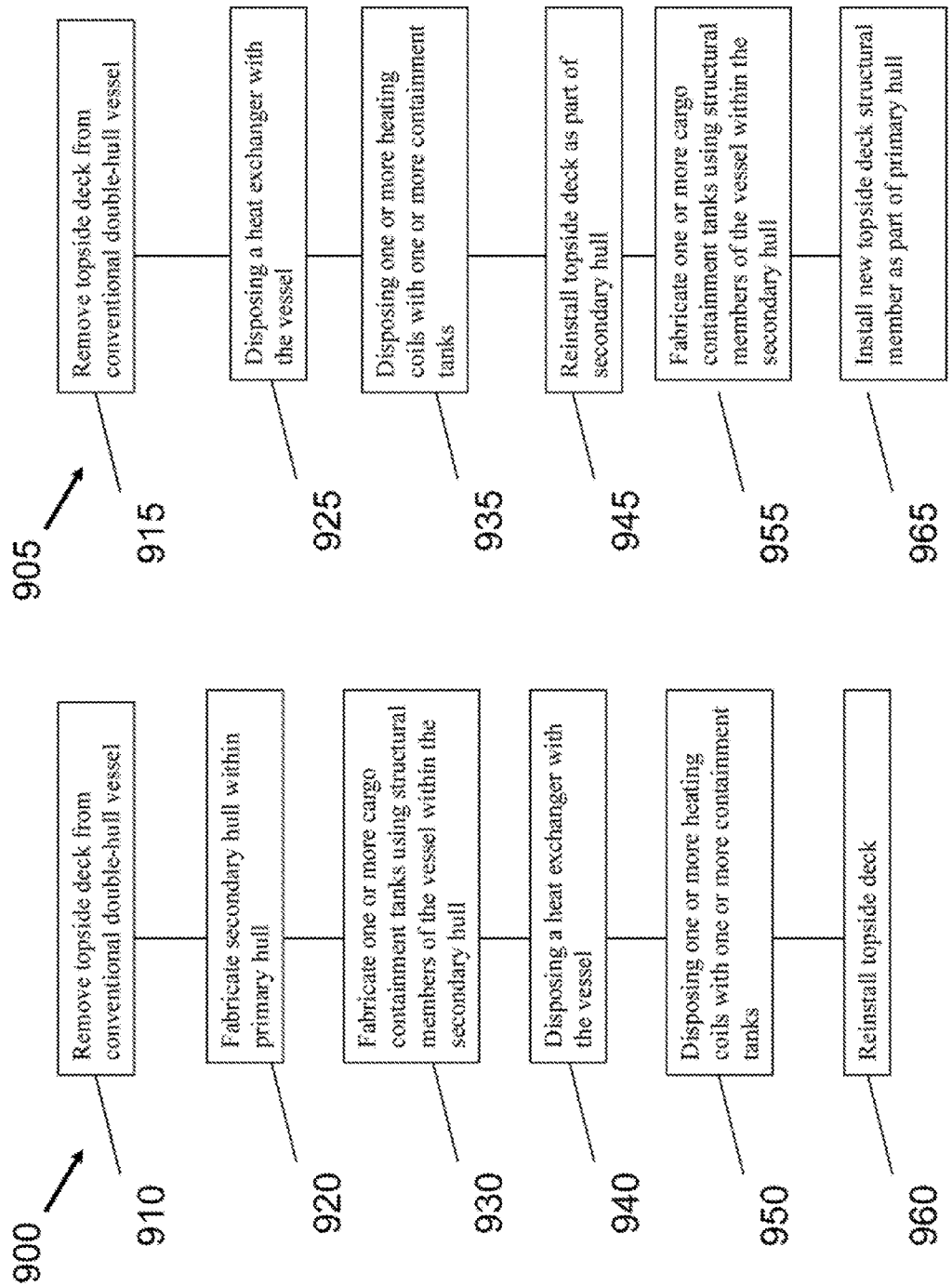

HEATING A CARGO BARGE USING RECOVERED ENERGY FROM ANOTHER VESSEL USING AN UMBILICAL

BACKGROUND OF THE DISCLOSURE

1. Field of Disclosure

This disclosure primarily relates to a complete integral tank double-hull containment vessel for the transportation of hot cargo. This disclosure also relates to heating the hot cargo on the containment vessel using heat from a tug boat using an umbilical.

2. Description of the Art

Conventional cargo transport vessels include inland barges transport on inland waterways and ocean going on oceans and limited inland. Inland cargo transport vessels typically transport cargo relatively short distances over inland waterways. Ocean-going cargo transport vessels typically transport cargo relatively long distances over oceans.

A conventional single-hull cargo transport vessel includes a single hull that provides a boundary between the operating environment of the vessel and the cargo. The hull includes a bottom side structural member, a starboard side structural member, a port side structural member, and a topside deck that are connected to form the exterior of the vessel. The hull also includes transverse and longitudinal bulkheads to provide strength, support, and stability to the hull. A cargo carrying volume is formed by the bottom side structural member, starboard side structural member, port side structural member, and topside deck of the vessel. If the hull is breached, cargo may be exposed to the outside environment and/or the outside environment may be exposed to the cargo. In these instances, contamination of the outside environment, the cargo, or both may occur. To address environmental concerns related to the breach of conventional single-hull cargo transport vessels, governmental regulations now require the use of double-hulls for designated vessels in United States waters.

In accordance with these regulations, a conventional double-hull cargo transport vessel, as approved by current United States Coast Guard and International regulations and standards includes a primary hull and a partial secondary hull that forms a double-hull with respect to the bottom, port, and starboard sides of the vessel. A cargo carrying volume is formed by the bottom side structural member, starboard side structural member, and port side structural member of the partial secondary hull and the topside deck of the primary hull. As such, only the portion of the conventional double-hull cargo transport vessel that is in contact with the operating waterline depth environment of the vessel is double-hulled to prevent the leakage of cargo in the event the primary hull is breached.

Hot cargo vessels are typically heated using heat sources (such as boilers) disposed on the vessel. On barges that carry hot cargo, heating the hot cargo requires the burning of fuel to generate heat on a vessel that is not configured for self-propulsion. What is needed is a system that allows heat from a second vessel to supply heat to the hot cargo vessel using an umbilical.

BRIEF SUMMARY OF THE DISCLOSURE

In aspects, the present disclosure is related to a system and method of transporting hot cargo on waterways. Specifically, the present disclosure is related to heating the cargo sections of a barge using heat from a second vessel using an umbilical.

According to one aspect of one or more embodiments of the present disclosure, a complete double-hull cargo containment vessel includes a primary hull and a secondary hull disposed within the primary hull. The secondary hull includes one or more interior cargo containment tanks and provides structural integrity to the vessel. The secondary hull includes a topside structural member configured to seal the cargo containment tank or tanks. The cargo tanks can include a split load of materials, such as hot asphalt and sulfur (sulphur) or a homogenous load of all asphalt or all sulfur. The cargo containment tanks are heated using heat exchangers (such as boilers).

According to one aspect of one or more embodiments of the present disclosure, a system for heating, the system comprising: a first watergoing vessel comprising: a first heat source; and a first heat exchanger in thermal communication with the first heat source; a second watergoing vessel comprising: a storage tank configured for hot cargo; and a second heat exchanger in thermal communication with the storage tank; and a heat transfer connector configured to circulate a heat transfer fluid between the first heat exchanger and the second heat exchanger. The system may also include a one pump configured to move the heat transfer fluid along the heat transfer umbilical or connector. The second watergoing vessel may include a second heat source. The second vessel may also include a valve assembly configured to switch heating of the second heat exchanger between the first heat source and the second heat source. The switching of the heating may be controlled by a temperature switch configured to control the valve assembly and responsive to at least one of: i) a temperature of the storage tank and ii) a temperature of the second heat exchanger. The system may also include a third watergoing vessel comprising: an additional storage tank configured for hot cargo; and a third heat exchanger in thermal communication with the additional storage tank; and an additional heat transfer connector configured to circulate the heat transfer fluid between the first heat exchanger and the third heat exchanger. The heat transfer connector and the additional heat transfer connector may be configured to circulate the heat transfer fluid between the watergoing vessels in series. The third watergoing vessel may be disposed between the first watergoing vessel and the second watergoing vessel. The heat transfer connector may be thermally insulated. The first heat source may be configured to provide propulsion for the first watergoing vessel. The first heat source may be configured to provide propulsion and heat simultaneously. The first watergoing vessel and the second watergoing vessel may be under weigh. The heat connector comprises a discharge umbilical and a return umbilical. The umbilicals may comprise a quick disconnect fitting. The second watergoing vessel is a complete integral tank double-hull cargo containment vessel. Other aspects of the present disclosure will be apparent from the following description and the appended claims.

According to one aspect of one or more embodiments of the present disclosure, a system for heating, a method of heating a cargo, the method comprising: heating a storage tank on a second watergoing vessel using a first heat source on a first watergoing vessel, wherein the storage tank is configured for hot cargo, and wherein i) the heat source is in thermal communication with a first heat exchanger on the first watergoing vessel, ii) the first heat exchanger is in thermal communication with a heat transfer connector configured to circulate a heat transfer fluid between the first heat exchanger and a second heat exchanger disposed on the second watergoing vessel, and iii) the second heat exchanger is in thermal communication with the storage tank. The second watergoing vessel may have a second heat source configured to heat the storage tank via the heat transfer fluid, and the method may further comprise switching a circulation flow of the heat transfer fluid between receiving heat from the second heat source and receiving heat from the first heat source. The method may also comprise a step of estimating a temperature of the hot cargo using a temperature sensor, wherein the switching of the circulation flow is based on a signal from the temperature sensor. The temperature sensor is in thermal communication with at least one of: i) the storage tank and ii) the second heat exchanger. Other aspects of the present disclosure will be apparent from the following description and the appended claims.

BRIEF DESCRIPTION OF DRAWINGS

For a detailed understanding of the present disclosure, reference should be made to the following detailed description of the embodiments, taken in conjunction with the accompanying drawings, in which like elements have been given like numerals, wherein:

FIGS. 6A and 6B show a typical arrangement of the vessel where the vessel includes a heater (heat exchanger) installation with coils and cargo compartments in accordance with one or more embodiments of the present disclosure;

FIGS. 8A, 8B, 8C, 8D, 8E, and 8F shows a structure of sections of retrofitted double-hull cargo containment vessels in accordance with one or more embodiments of the present disclosure;

FIGS. 9A and 9B show methods of retrofitting a conventional double-hull cargo containment vessel into a complete integral tank double-hull cargo containment vessel in accordance with one or more embodiments of the present disclosure;

DETAILED DESCRIPTION OF THE DISCLOSURE

Figure 1A:
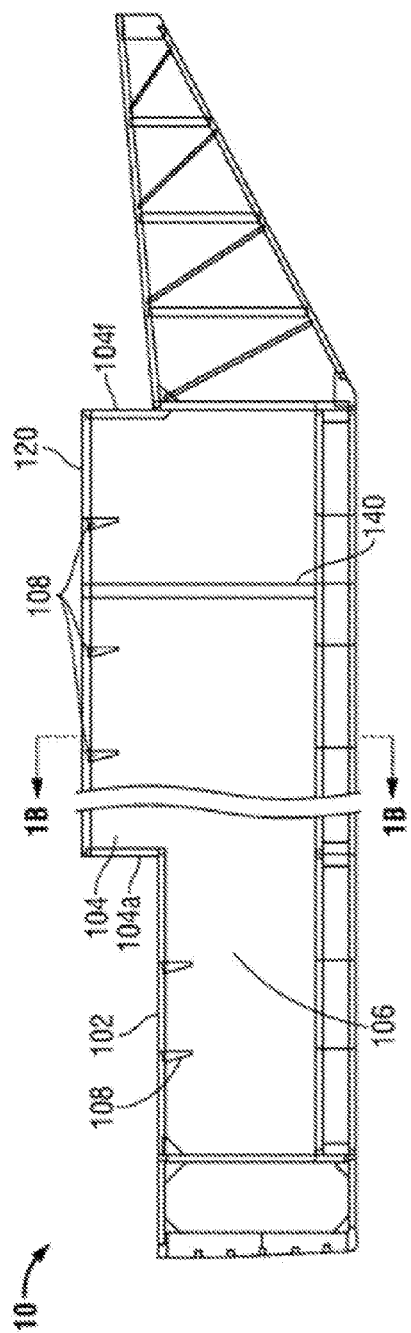
FIG. 1A shows a profile view of a conventional double-hull cargo transport vessel.

Generally, the present disclosure involves a system and method of transporting cargo on waterways. Specifically, the present disclosure is related to transporting hot cargo while maintaining containment of the hot cargo with respect to the outside environment. The present disclosure is susceptible to embodiments of different forms. The present disclosure is also related to retrofitting conventional double-hull vessels into complete double-hull vessels configured to transport hot cargo. The present disclosure is also related to heating hot cargo on one vessel with heat source disposed on another vessel. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIG. 1A shows a profile view of a conventional double-hull cargo transport vessel. The conventional double-hull cargo transport vessel 10 includes a machinery deck 102 that is part of the top of cargo tank 106. The machinery deck 102 includes transverse frame supports 108 along the underside of the machinery deck 102. The vessel 10 also includes a raised deck portion 104 which can also be used for cargo storage. The raised deck portion 104 includes a top deck structural member 120 and the transverse frame supports 108 disposed along the underside of the top deck member 120, a forward side member 104f, a aft side member 104a, a port side member 104p (shown in FIG. 1B) and an starboard side member 104s (shown in FIG. 1B).

Figure 1B:
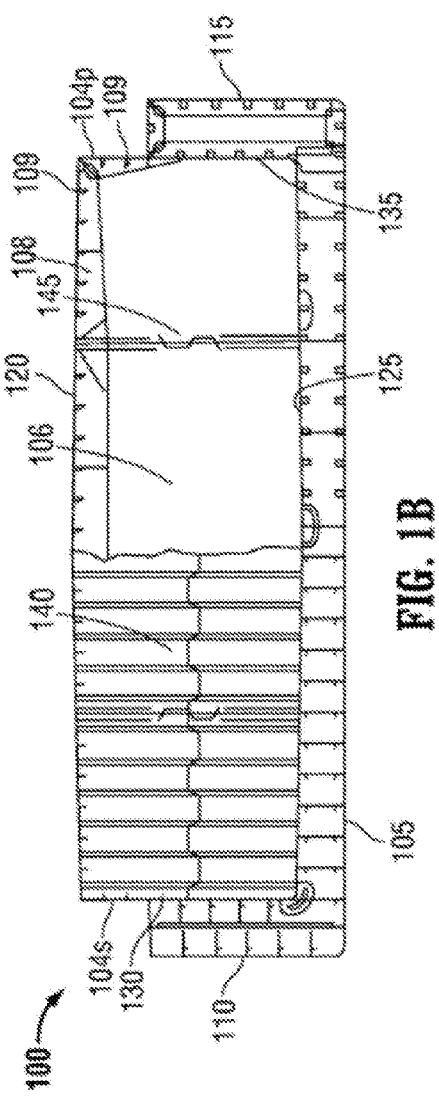
FIG. 1B shows a mid-ship section of a conventional double-hull cargo transport vessel as viewed from forward looking aft.

FIG. 1B shows a mid-ship section of a conventional double-hull cargo transport vessel viewing the vessel from forward to stern. Mid-ship section 100 shows a cross-sectional view of the middle of the conventional double-hull cargo transport vessel 10 (shown in FIG. 1A). One of ordinary skill in the art will recognize that, in accordance with industry standards, the cross-sectional view of the middle of the vessel shows transverse bulkheads on one side of the figure and transverse truss structures on the other side of the FIG. 1B.

A primary hull of the conventional double-hull cargo transport vessel 10 comprises a bottom side structural member 105, a starboard side structural member 110, a port side structural member 115, and a topside deck 120 that are generally formed of steel and joined together to form the primary hull. A transverse frame (or beam) support 108 of the topside deck 120 is shown. Longitudinal frame supports 109 are also shown. A partial secondary hull of the conventional double-hull cargo transport vessel 10 comprises a bottom side structural member 125, a starboard side structural member 130, and a port side structural member 135 that are generally formed of steel and joined together to form the partial secondary hull. This hull configuration of two bottom structural members 105, 125, two starboard side structural members 110, 130, two port side structural members 115, 135, and one topside deck 120 is commonly referred to as "a double-hull configuration" in industry.

The interior cargo carrying volume 106 of the conventional double-hull cargo transport vessel 10 is bounded by a bottom structural member 125, a starboard side structural member 130, and a port side structural member 135 of the partial secondary hull and depending upon the location of the interior cargo carry volume 106, the machinery deck 102 and the topside deck 120 of the primary hull. The cargo carrying volume 106 of the vessel 10 may be partitioned into one or more cargo containment tanks transversely by one or more transverse bulkheads 140 or longitudinally by one or more longitudinal bulkheads 145. In certain areas of the vessel 10, the cargo containment tanks may not include the volume provided in the raised deck portion 104.

The conventional double-hull design promotes the use of internal cargo tank framing. External topside framing is exposed to the elements and subject to corrosion/pitting, even if protective coatings are applied to the external topside framing.

The transport of some cargo requires maintaining the cargo at high temperatures during transport. This type of cargo may be referred to as "hot cargo". Examples of hot cargo may include, but are not limited to, one or more of: i) liquid asphalt, ii) molten sulfur, and iii) molten phenol. Liquid asphalt is typically transported at approximately 325 degrees Fahrenheit. Molten sulfur is typically transported at approximately 300 degrees Fahrenheit. Molten phenol is typically transported at approximately 140 degrees Fahrenheit.

A conventional double-hull cargo transport vessel utilizes one or more diesel-fired heat exchangers to heat one or more layers of heating coils disposed in a cargo tank to maintain the required temperature of the hot cargo during transport. The size and number of heat exchangers and heating coils is dependent on the size and configuration of the vessel 10 and the temperature requirements of the cargo to be transported. In addition to the initial cost for installing the heat exchangers and the heating coils, there is a recurring cost for their maintenance.

In operation, the heat exchangers consume fuel (such as diesel fuel) during transport. Thus, a cost for fuel is added to the cost of transport when the heat exchangers are required to operate during transport. The per transport cost of fuel required by the heat exchangers to maintain hot cargo at the appropriate temperature may be a substantial portion of the transport cost and may be proportional to the duration of the transport. In a conventional double-hull design, the cost of fuel may be increased due to heat loss through the topside deck structural member 120, which may be extensive. Substantial heat loss through the topside deck structural member 120 may require the heat exchangers to use more fuel to maintain the hot cargo at its required temperature.

The resultant heating of the topside deck structural member 120 may also present a hazard, or at least an uncomfortable situation, for personnel that may be present on top of the topside deck structural member 120. If the vessel operator wishes to make the topside deck structural member 120 safe for walking, insulation may be applied to effectively reduce the temperature of the topside deck member 120, however, this addition may add more cost to the vessel 10 for the insulation, as well as the installation and maintenance of the insulation.

Figure 2A:
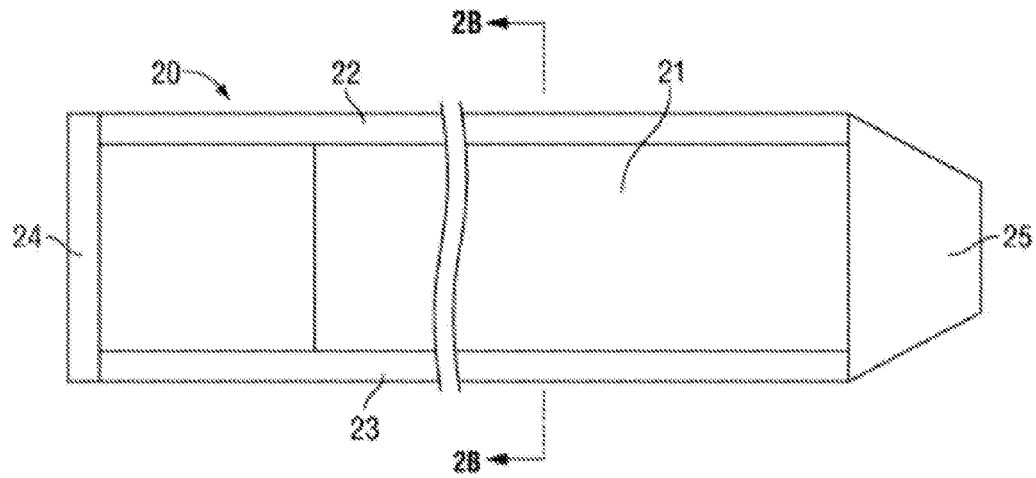
FIG. 2A shows a top view of a complete integral tank double-hull cargo containment vessel in accordance with one or more embodiments of the present disclosure.

FIG. 2A shows a top view of a complete integral tank double-hull cargo containment vessel 20 in accordance with one or more embodiments of the present disclosure. A raised trunk (and/or canopy) portion 21 of the complete integral tank double-hull cargo containment vessel 20 is shown, along with wing void tank areas 22 and 23 and aft and forward rake voids 24 and 25, respectively. Although not shown, one skilled in the art can appreciate that the raised portion 21 can extend from forward to aft to create a substantially box-shaped vessel.

Figure 2B:
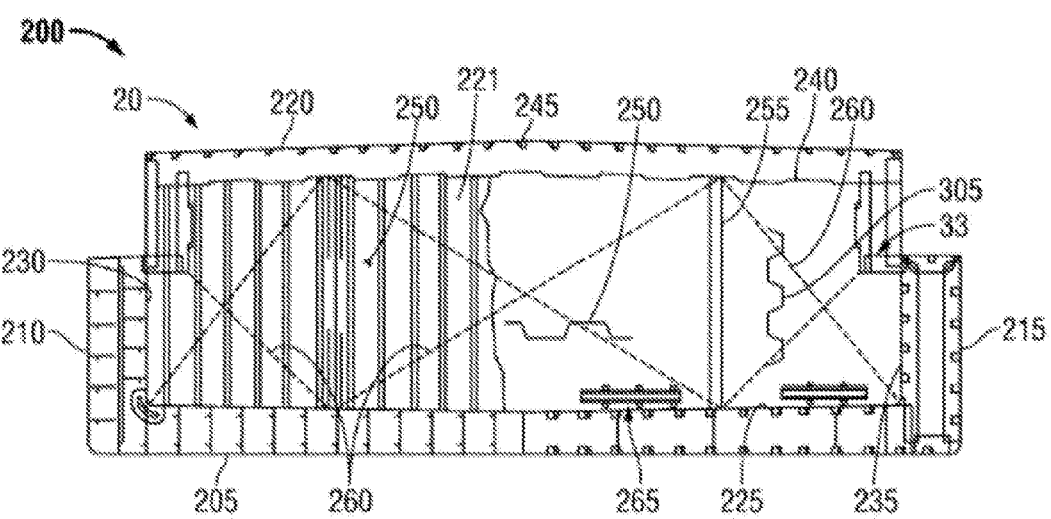
FIG. 2B shows a mid-ship section view of a complete integral tank double-hull cargo containment vessel as viewed from forward looking aft in accordance with one or more embodiments of the present disclosure.

FIG. 2B shows a mid-ship section of a complete integral tank double-hull cargo containment vessel 20 in accordance with one or more embodiments of the present disclosure. Mid-ship section 200 shows a cross-sectional view of the middle of a complete double-hull cargo containment vessel 20 in accordance with one or more embodiments of the present disclosure. One of ordinary skill in the art will recognize that, in accordance with industry standards, the cross-sectional view of the middle of the complete integral tank double-hull cargo containment vessel 20 shows transverse bulkheads 250 on the left side of the figure, and transverse truss structures on the right side of the figure.

In one or more embodiments of the present disclosure, a primary hull of a complete integral tank double-hull cargo containment vessel 20 comprises a bottom side structural member 205, a starboard side structural member 210, a port side structural member 215, and a topside deck structural member 220 that are generally formed of steel and joined together to form the primary hull. Each of the bottom side structural member 205, the starboard side structural member 210, the port side structural member 215, and the topside deck structural member 220 may individually comprise a plurality of sheet metal panels that are joined to form the respective structural members used to form the primary hull. Because unsupported sheet metal can deform when a force is exerted on it, reinforcements are used to provide strength and stability to the primary hull. The topside deck structural member 220 comprises a plurality of longitudinal panel stiffening beams 245 that are joined to the topside of the topside deck structural member 220. Each longitudinal panel stiffening beam 245 is generally comprised of sheet metal. The longitudinal panel stiffening beams 245 may be disposed on top of topside deck structural member 220, on the underside of topside structural member 220, or both. One of ordinary skill in the art will recognize that the number, orientation, and configuration of panel stiffening beams may vary in accordance with one or more embodiments of the present disclosure. The primary hull is water tight and serves as a first boundary between the operating environment of the complete integral tank double-hull cargo containment vessel 20 and the cargo.

In accordance with one or more embodiments of the present disclosure, a secondary hull of a complete integral tank double-hull cargo containment vessel 20 may comprise a bottom side structural member 225, a starboard side structural member 230, a port side structural member 235, a topside structural member 240 and a structural member 33 for the raised trunk portion 21 (at main deck level) that are generally formed of steel and joined together to form a complete secondary hull that is integrally disposed within the primary hull. Each of the bottom side structural member 225, the starboard side structural member 230, the port side structural member 235, the topside structural member 240 and the structural member 33 may generally comprise a plurality of sheet metal panels that are joined to form the respective structural members used to form the secondary hull. The various members are integral to the structural integrity of the complete integral tank double-hull cargo containment vessel 20. Advantageously, cargo may be contained within the secondary hull separate and apart from the primary hull, and the secondary hull is itself disposed within the primary hull. As a consequence, the secondary hull is configured such that hot cargo (such as oil, chemicals, etc.) and their respective fumes are sealed off from the operating environment of the complete integral tank double-hull cargo containment vessel 20 and the cargo.

In some embodiments, the complete integral tank double-hull cargo containment vessel 20 comprises an interior cargo carrying volume 221 that is bounded by the bottom side structural member 225, starboard side structural member 230, port side structural member 235, and the topside structural member 240 of the secondary hull. Advantageously, the entire interior cargo carrying volume is integrally disposed within the secondary hull that is itself integrally disposed within the primary hull.

The cargo carrying volume 221 may be partitioned into one or more cargo containment tanks 260. The cargo carrying volume may be partitioned transversely by one or more transverse bulkheads 250 and/or longitudinally by one or more longitudinal bulkheads 255. One or more of the transverse bulkheads 250 may be formed of corrugated sheet metal panels 305. One or more of the longitudinal bulkheads 255 may be formed of corrugated sheet metal panels 305. The one or more cargo containment tanks of the secondary hull are sealed by the topside structural member 240 of the secondary hull. Various or homogenous materials may be contained in the various compartment tanks depending on a customer's requirement.

In one or more embodiments of the present disclosure, one or more heating coils 265 are disposed within cargo containment tank 260. Advantageously, in one or more embodiments of the present disclosure, the entire interior cargo carrying volume of the complete integral tank double-hull cargo containment vessel 20 is disposed within the secondary hull that is itself disposed within the primary hull. As such, the secondary hull is insulated by the primary hull. Thus, in a complete integral tank double-hull cargo containment vessel 20, heat loss through the topside deck structural member 220 is substantially less than that of a conventional double-hull cargo transport vessel 10. As a consequence, the complete double-hull reduces vessel fabrication costs and energy costs associated with maintaining hot cargo at its required temperature during transport.

Figure 3:
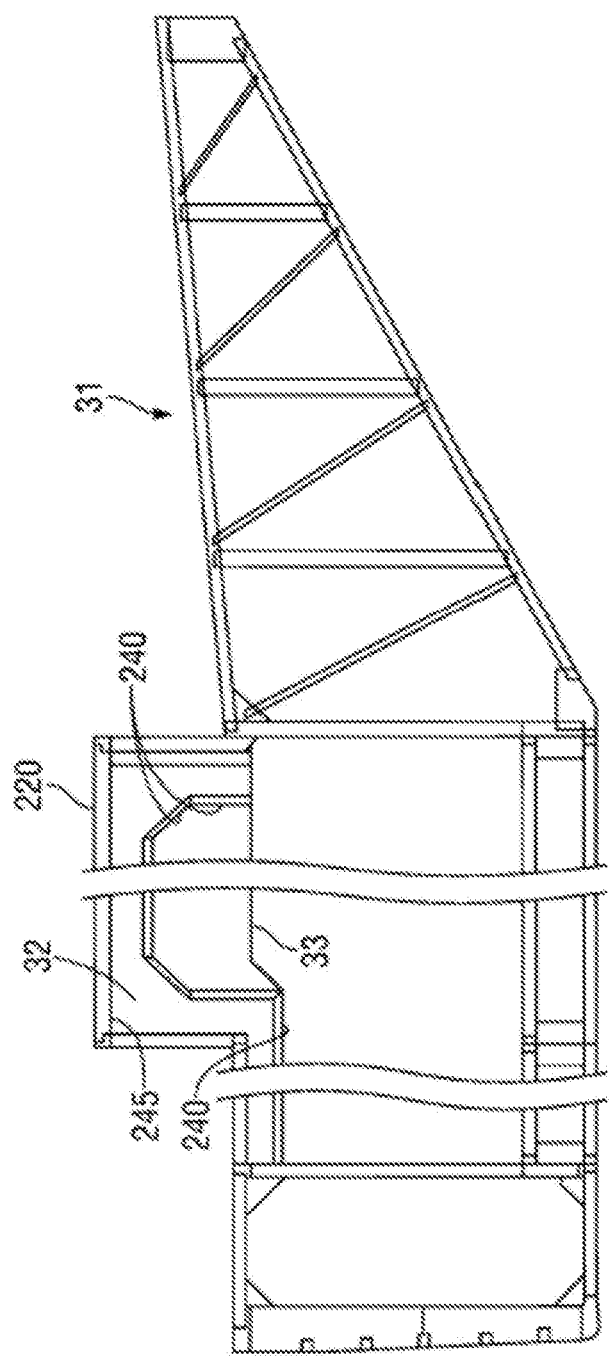
FIG. 3 shows a profile of the complete integral tank double-hull cargo containment vessel in accordance with one or more embodiments of the present disclosure.

FIG. 3 includes a partial profile view of the complete integral tank double-hull cargo containment vessel 20. The complete integral tank double-hull cargo containment vessel 20 may include a forward rake 31 and a raised trunk 32. The top deck structural member 220 with a longitudinal panel stiffening beam 245 of the raised trunk 32 is also shown.

Figure 4A:
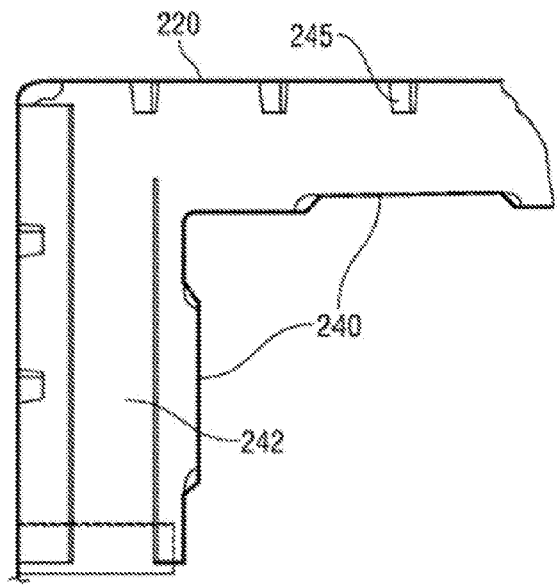
FIGS. 4A, 4B, and 4C show mid-ship section views of the tank top of the complete integral tank double-hull cargo containment vessel in accordance with one or more embodiments of the present disclosure.
Figure 4B:
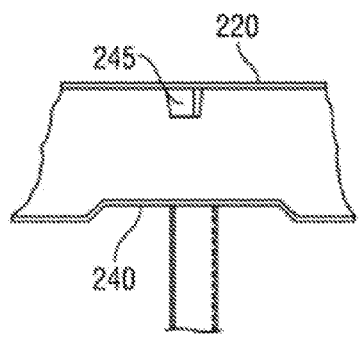
Figure 4C:
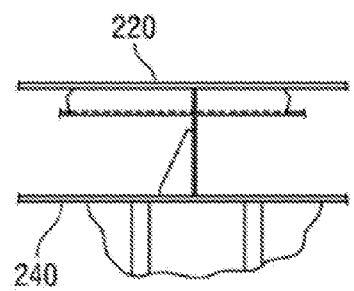

FIGS. 4A, 4B and 4C shows details of the novel double-hull containment of FIG. 2B in the areas which were not afforded double-hull protection in the conventional prior art design. Double-hull containment includes the topside structural member 220 and intersection of trunk sides to main (wing) deck. A void space 242 between the topside deck member 220 and the topside member of secondary hull 240 is shown.

Figure 5A:
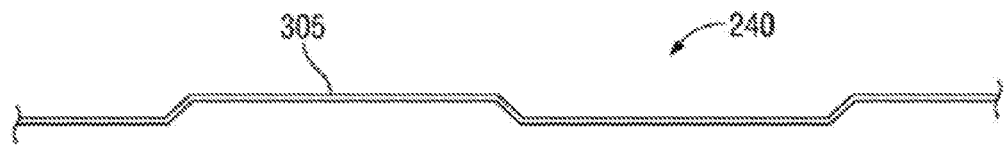
FIGS. 5A and 5B show structural members of the novel double-hull containment of the cargo tank top; either with a corrugated bulkhead (raised trunk) or flat plate structural member with suitable stiffeners in accordance with one or more embodiments of the present disclosure.

FIG. 5A shows a longitudinal corrugated topside structural member 240 of the secondary hull in accordance with one or more embodiments of the present disclosure. A longitudinal corrugated sheet metal panel 305 is sheet metal of a predetermined length and width that is, for example, 5/16 of an inch thick. One of ordinary skill in the art will recognize that the dimensions of a corrugated sheet metal panel may vary in accordance with one or more embodiments of the present disclosure. The longitudinal corrugated sheet metal panel 305 panel is corrugated in the longitudinal direction with respect to the lengthwise axis of the vessel. Topside structural member 240 of the secondary hull comprises a plurality of longitudinal corrugated sheet metal panels 305. One of ordinary skill in the art will recognize that the number, orientation, and configuration of corrugated sheet metal panels may vary in accordance with one or more embodiments of the present disclosure. The use of corrugated sheet metal panels or plates 305 reduces the number of required panel stiffening beams 246 and saves the associated cost in fabrication and materials. In one or more embodiments of the present disclosure, panel stiffening beams are not required for reinforcement of the topside structural member 240 of the secondary hull.

Advantageously, the use of corrugated sheet metal panels 305 to form the topside structural member 240 of the secondary reduces costs associated with the application, removal, and re-application of special coatings to one or more cargo containment tanks. If the topside structural member 240 is comprised of panel stiffening beams 245, the interior of one or more cargo containment tanks are not smooth and applied coating substances can build up at the interface of the panel stiffening beams 246 and the topside structural member 240. If the topside structural member 240 is comprised of corrugated sheet metal panels 305, the interior of one or more cargo containment tanks are smooth and applied coating substances can more easily be applied, removed, and re-applied. Maintenance costs for the topside structural member 240 may be reduced through the use of special coatings (reflective, anti-corrosion, etc.).

Figure 5B:
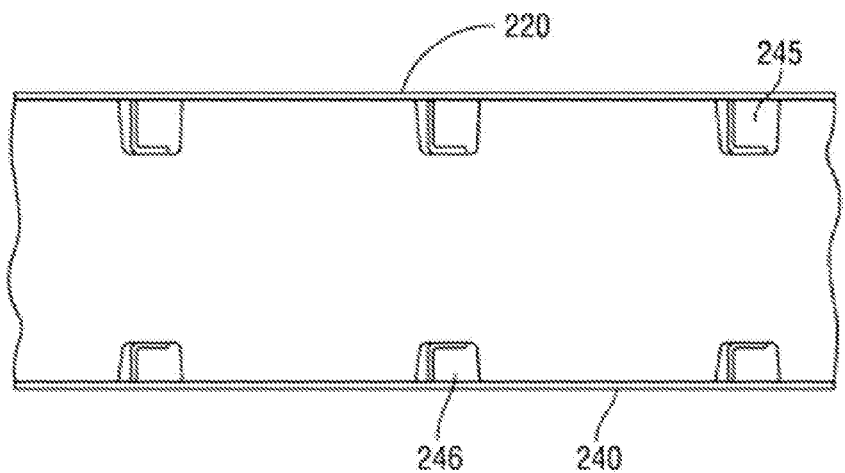

The complete double-hull provides strength and structural support to the complete integral tank double-hull cargo containment vessel 20 that is greater than that of a conventional double-hull cargo transport vessel 10. Unlike a conventional double-hull cargo transport vessel 10, where the topside deck structural member 120 may be used to provide structural integrity for the primary hull and the secondary hull, the complete double-hull design provides for structural support of the primary and secondary hulls from the topside deck structural member 220 and the topside structural member 240. The complete double-hull design provides for the flexibility of having the topside members 220, 240 each dedicated to a specific hull or having the topside members 220, 240 provide shared support in various combinations, as would be understood by one of skill in the art. In one or more embodiments of the present disclosure, the topside structural member 240 is generally comprised of sheet metal. Because unsupported sheet metal can deform when a force is exerted on it, reinforcements can be used to provide strength and stability to the secondary hull. In one or more embodiments of the present disclosure, panel stiffening supports or beams are used for reinforcement. FIGS. 5A and 5B shows a panel stiffened topside structural member 240 of a secondary hull in accordance with one or more embodiments of the present disclosure. The topside structural member 240 of the secondary hull may comprise a plurality of longitudinal panel stiffening beams (or supports) 246 that are joined to the topside structural member 240. Each longitudinal panel stiffening beam 246 is generally comprised of sheet metal. The longitudinal panel stiffening beams 246 may be disposed on top of topside structural member 240, on the underside of topside structural member 240, or both. One of ordinary skill in the art will recognize that the number, orientation, and configuration of panel stiffening beams may vary in accordance with one or more embodiments of the present disclosure. In some embodiments, because the secondary hull is disposed within the primary hull and the raised trunk formed by the topside structural member 240 of the secondary hull is covered by the topside deck structural member 220 of the primary hull, the longitudinal panel stiffening beams 246 may be used for reinforcement of the topside structural member 240 with a reduced risk of degradation due to standing water and/or corrosion.

FIGS. 6A and 6B show an exemplary top view arrangement of one or more embodiments of the present disclosure. In one or more embodiments of the present disclosure, and shown in FIG. 6A, a smaller heat exchanger 270 may be used in a complete integral tank double-hull cargo containment vessel 20 than in a conventional double-hull cargo transport vessel 10 with similarly sized cargo tank or tanks to maintain hot cargo at its required temperature during transport. A substantial cost savings is realized in acquiring and fabricating the smaller heat exchanger 270 and fuel costs associated with the heat exchanger 270. In addition, the heat exchanger 270 may have a reduced physical footprint allowing for more reclamation of valuable vessel space. In FIG. 6A, the heat exchanger 270 (typically housed on the machinery deck) is connected to coils 265 to provide thermal fluid (such as hot oil) heating through designated cargo tanks 272, 273 in accordance with one or more embodiments of the present disclosure. One skilled in the art can appreciate that the complete integral tank double-hull cargo containment vessel 20 can include additional forward, aft or wing (port or starboard) tanks (shown in FIG. 6A, but do not include reference numbers). Heating coils 265 may be routed to the additional tanks should it be necessary to transport heated materials in these tanks.

FIG. 6B illustrates the access domes and valves 275 on the top deck of the complete integral tank double-hull cargo containment vessel 20. The domes and valves 275 allow topside access to the containment tanks (it is noted that the figure does not show valves and ports for all containment tanks, but that one skilled in the art can appreciate that there would be an access dome to all containment tanks).

Since the double-hull structure allows insulation between topside deck structural member 220 and topside structural member 240, thermal losses through the top of the double-hull may be reduced. This thermal loss reduction may result in a reduced amount fuel being required to power the one or more heat exchangers 270 that drives one or more heating coils 265. This results in substantial per transport fuel cost savings over a conventional double-hull cargo transport vessel 10. In addition, the size and/or number of heating coils 265 disposed within each cargo containment tank 260 may be reduced because fewer heating coils 265 are required in a complete integral tank double-hull cargo containment vessel 20 than in a conventional double-hull cargo transport vessel 10 with similarly size cargo tank or tanks to maintain hot cargo at its required temperature during transport. As a result, vessel fabrication costs associated with the heating coils 265 are reduced and the energy costs associated with maintaining hot cargo at its required temperature during transport is substantially reduced. Additionally, reducing the volume occupied by heating coils 265 may increase volume available for storing hot cargo or other ship functions.

Further, because of the thermal insulation provided by the complete double-hull design (due to a void space between the topside members 220, 240), the temperature of topside deck 120, on which vessel crew may walk, may be sufficiently reduced to allow for personnel to walk on the topside deck 120 above a hot cargo without risk of temperature related injury. As a result, use of an insulating material is not required to make the topside deck member 120 walkable. This reduces the costs typically associated with installing insulating materials for the topside deck 120 in a conventional double-hull cargo transport vessel 10 and/or the cost of human protection devices. However, if desired, insulating materials may be added to the void space created by the complete integral double-hull design.

In some embodiments, the complete integral tank double-hull cargo containment vessel 20 may be used to transport volatile cargo subject to releasing fumes when exposed to temperature increases. Here, the complete double-hull design may reduce the heat transfer from outside the complete integral tank double-hull cargo containment vessel 20, such as due to radiant sunlight on the top deck 220, into the volatile cargo due to the insulating properties of the void space between top deck 220 and topside structural member 240. Thus, the complete double-hull design may reduce vapor pressure within the volatile cargo containment by reducing the amount of heat being added to the volatile cargo when the complete integral tank double-hull cargo containment vessel 20 is exposed a warm environment.

The reduced heat transfer in a complete integral tank double-hull cargo containment vessel 20 may have the added benefit of increasing the variety of volatile cargoes that may be transported without requiring recertification of the vessel as a pressure vessel. In embodiments where the complete integral thank double-hull cargo containment vessel 20 is configured for carrying volatile cargo, heating equipment (heating coils 265 and heat exchanger 270) may be optional.

In one or more embodiments of the present disclosure, a draft line of a complete integral tank double-hull cargo containment vessel 20 is established, in part, by the exterior of the vessel defined by the primary hull, the cargo carrying volume of the secondary hull, and the apparent specific gravity of the cargo in one or more cargo containment tanks. The apparent specific gravity of cargo is a ratio of the weight of the volume of cargo to the weight of an equal volume of a reference substance, for example, water. The apparent specific gravity of liquid asphalt is approximately 1.1 grams per cubic centimeter at transport temperature and the apparent specific gravity of molten sulfur is approximately 1.8 grams per cubic centimeter at transport temperature. Because these hot cargos have different specific gravities, the volume of hot cargo that may be transported in a given vessel, while meeting the draft requirements, differs based on the type of hot cargo. For example, a given volume of a substance with a higher specific gravity weighs more than an equal volume of a substance with a lower specific gravity. As such, the amount of cargo that can be transported in a given cargo carrying volume, within the draft requirements of the complete integral tank double-hull cargo containment vessel 20, differs based on the cargo transported. Moreover, a specific cargo may require a special coating to be applied to a cargo containment tank 260 whereas a different cargo may require a different special coating to be applied to a cargo containment tank 260.

In one or more embodiments of the present disclosure, two longitudinal bulkheads 255 partition the cargo carrying volume of the secondary hull into three cargo containment tanks 260. The starboard side and port side cargo containment tanks 260 are dedicated to the transport of liquid asphalt. The starboard side and port side cargo containment tanks 260 may be coated with a special coating required by the liquid asphalt. One of ordinary skill in the art will recognize that a different cargo may be used in the place of liquid asphalt in accordance with one or more embodiments of the present disclosure. The middle cargo containment tank 260 may be dedicated to the transport of molten sulfur.

The middle cargo containment tank 260 may be coated with a special coating required by molten sulfur. One of ordinary skill in the art will recognize that a different cargo may be used in the place of molten sulfur in accordance with one more embodiments of the present disclosure. Thus, a complete integral tank double-hull cargo containment vessel 20 may have starboard and port side cargo containment tanks 260 coated for one cargo and a middle cargo containment tank 260 that is coated for a different cargo.

Advantageously, this configuration allows a complete integral tank double-hull cargo containment vessel 20 to transport liquid asphalt and molten sulfur without modification to or turnaround service on the complete integral tank double-hull cargo containment vessel 20. For example, the starboard and port side cargo containment tanks 260 may be prepared for liquid asphalt cargo and the middle cargo containment tank 260 may be prepared for molten sulfur. As such, a complete integral tank double-hull cargo containment vessel 20 may transport liquid asphalt up river to one destination and then transport molten sulfur down river to another destination without requiring a turnaround service on the complete integral tank double-hull cargo containment vessel 20. However, in another embodiment, rather than a split load, the complete integral tank double-hull cargo containment vessel 20 can transport homogenous materials, such as all asphalt or all sulfur in the cargo tanks 260. Thus, a complete integral double-hull cargo containment vessel 20 may be more efficient, provide higher cost efficiency, and generate higher transport revenues than a conventional double-hull cargo transport vessel 10.

Figure 7:
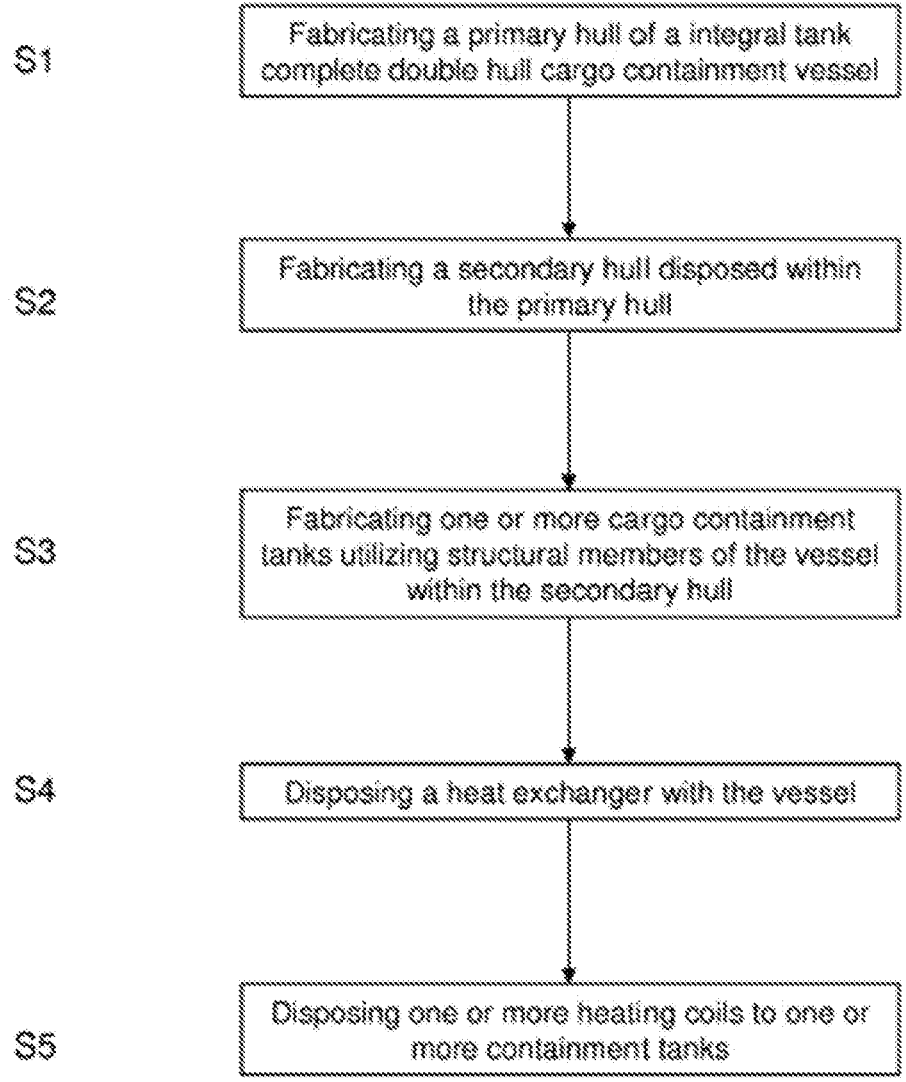
FIG. 7 shows a method of manufacturing a complete integral tank double-hull cargo containment vessel in accordance with one or more embodiments of the present disclosure.

FIG. 7 shows a method of retrofitting a conventional vessel to a complete integral tank double-hull cargo containment vessel 20 in accordance with one or more embodiments of the present disclosure. In step S1, a primary hull of a conventional vessel is retrofitted for use as a complete integral tank double-hull cargo containment vessel 20. The primary hull comprises a bottom side structural member 205, starboard side structural member 210, port side structural member 215, and a topside deck structural member 220. In step S2, a secondary hull of a complete integral tank double-hull cargo containment vessel 20 is fabricated. The secondary hull comprises a bottom side structural member 225, starboard side structural member 230, port side structural member 235, and a topside structural member 240. In one or more embodiments of the present disclosure, the topside structural member 240 comprises a plurality of corrugated sheet metal panels 246.

In step S3, one or more cargo containment tanks 260 are fabricated within the secondary hull of the complete integral tank double-hull cargo containment vessel 20. One or more transverse bulkheads 250 may be used to partition the secondary hull to form one or more cargo containment tanks 260. One or more longitudinal bulkheads 255 may be used to partition the secondary hull to form one or more cargo containment tanks 260. In one or more embodiments of the present disclosure, two longitudinal bulkheads 255 are fabricated to partition the secondary hull cargo carrying volume into three cargo containment tanks 260. In one or more embodiments of the present disclosure, the three cargo containment tanks 260 are configured to facilitate the transport of different cargos without turnaround service. The cargo containment tanks 260 are sealed by the secondary hull, which is disposed within the primary hull of the complete integral tank double-hull cargo containment vessel 20. In step S4, one or more heat exchangers 270 may be disposed on or within the complete integral tank double-hull cargo containment vessel 20 and secured in place. In step S5, one or more heating coils 265 may be disposed within each of the one or more cargo containment tanks 260. One of ordinary skill in the art will recognize that at least some of steps S1-S5 may be performed in different order to realize construction and cost efficiencies or customer preferences.

Figure 8B:
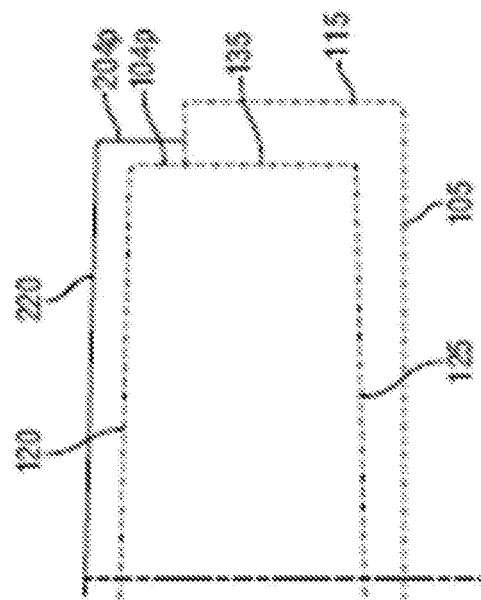
Figure 8A:
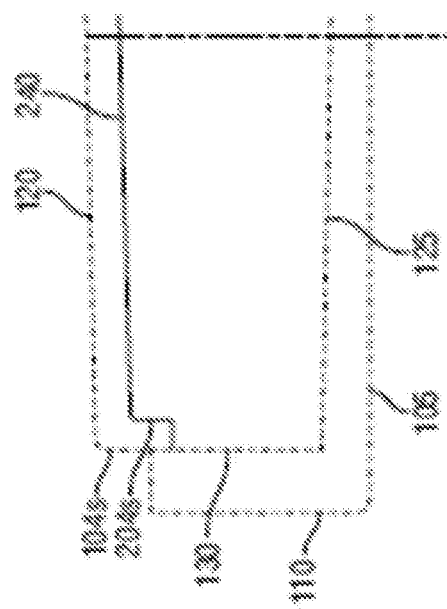

FIGS. 8A-8F show sections of complete integral tank double-hull cargo containment vessels 20 that have been retrofitted from conventional double-hull cargo transport vessels 10. While FIGS. 8A-8F show port and starboard sections, one of ordinary skill in the art would understand that the sections may be implemented on both starboard and port sides of a vessel. FIG. 8A shows a starboard side section of a conventional double-hull cargo transport vessel 10 with the topside deck 120 and the starboard side member 104s. The topside structural member 240 may be disposed below topside deck 120 and attached to starboard side member 204s. The clearances between i) the topside deck 120 and the topside structural member 240 and ii) the starboard side member 104s and the starboard side member 204s may be selected to conform to regulatory and/or design requirements or preferences.

FIG. 8B shows a port side section of a conventional double-hull cargo transport vessel 10 with the topside deck 120 and the port side member 104p. The topside deck structural member 220 may be disposed above topside deck 120 and attached to port side member 204p. The clearances between i) the topside deck 120 and the topside deck structural member 220 and ii) the port side member 104p and the port side member 204p may be selected to conform to regulatory and/or design requirements or preferences.

FIG. 8C shows a starboard side section of a conventional double-hull cargo transport vessel 10 with the topside deck 120 and the starboard side member 104s. Here, the corner of topside deck 120 is angled. The topside structural member 240 may be disposed below topside deck 120 and attached to starboard side member 204s. The topside structural member 240 may be angled to conform to the design of topside deck 120, however, such conformity with the general shape of topside deck 120 is not a requirement. The clearances between i) the topside deck 120 and the topside structural member 240 and ii) the starboard side member 104s and the starboard side member 204s may be selected to conform to regulatory and/or design requirements or preferences.

Figure 8D:
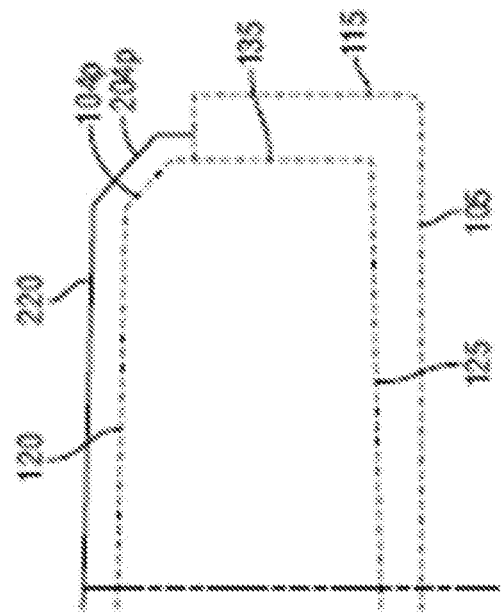

FIG. 8D shows a port side section of a conventional double-hull cargo transport vessel 10 with the topside deck 120 and the port side member 104p. Here, the corner of topside deck 120 is angled. The topside deck structural member 220 may be disposed above topside deck 120 and attached to port side member 204p. The topside structural member 240 may be angled to conform to the design of topside deck 120, however, such conformity with the general shape of topside deck 120 is not a requirement. The clearances between i) the topside deck 120 and the topside deck structural member 220 and ii) the port side member 104p and the port side member 204p may be selected to conform to regulatory and/or design requirements or preferences.

Figure 8E:
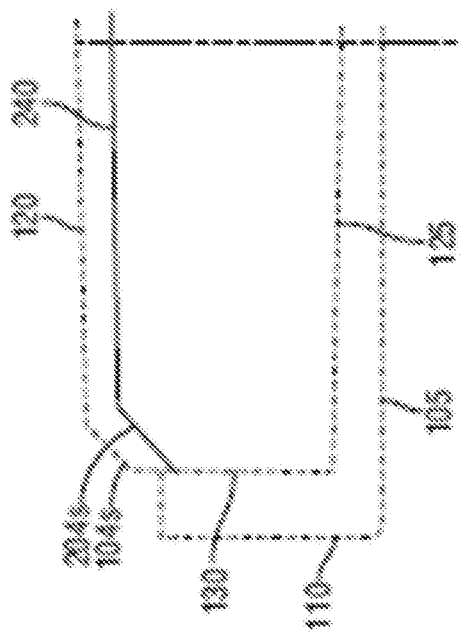
Figure 8E:
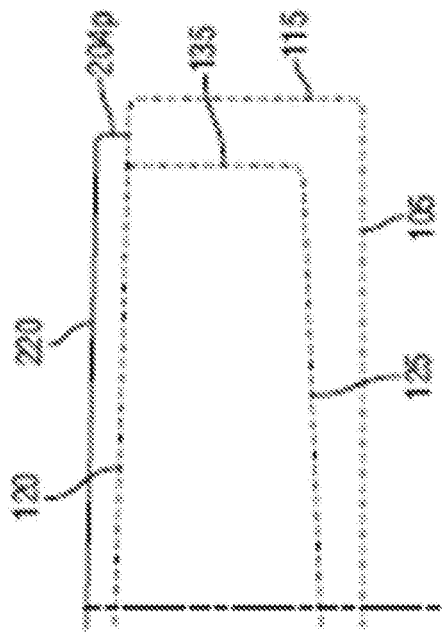

FIG. 8E shows a starboard side section of a conventional double-hull cargo transport vessel 10 with the topside deck 120. The topside structural member 240 may be disposed below topside deck 120 and attached to starboard side structural member 115. The clearance between the topside deck 120 and the topside structural member 240 may be selected to conform to regulatory and/or design requirements or preferences.

Figure 8F:
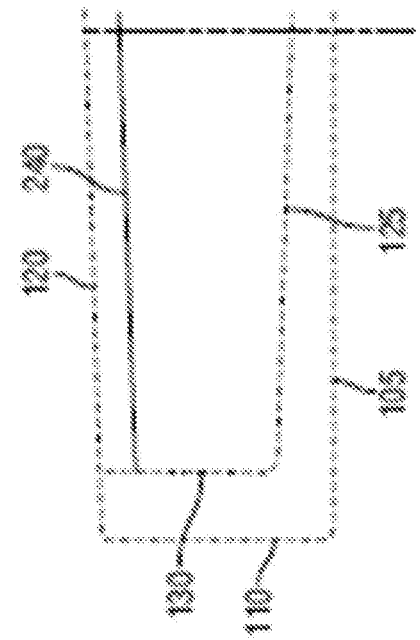

FIG. 8F shows a port side section of a conventional double-hull cargo transport vessel 10 with the topside deck 120. The topside deck structural member 220 may be disposed above topside deck 120 and attached to port side member 204p. The clearance between the topside deck 120 and the topside deck structural member 220 may be selected to conform to regulatory and/or design requirements or preferences.

FIG. 9A shows a flow chart of a method 900 for retrofitting a conventional double-hull cargo transport vessel 10 to form a complete integral tank double-hull cargo containment vessel 20. In method 900, the existing topside deck 120 of the conventional double-hull cargo transport 10 will become part of the primary hull of the complete integral tank double-hull cargo containment vessel 20. In step 910, a topside deck 120 of a conventional double-hull cargo vessel 10 may be removed. In step 920, a topside structural member 240 may be fabricated as part of a secondary hull within the primary hull. In step 930, one or more cargo containment tanks may be fabricated using structural members of the secondary hull. In step 940, a heat exchanger 270 may be disposed in the conventional double-hull cargo transport vessel 10. In step 950, one or more heating coils may be disposed in one or more of the containment tanks. In step 960, the topside deck 120 may be reinstalled forming complete integral tank double-hull cargo containment vessel 20. In some embodiments, steps 920, 930, 940, and 950 may be performed in different orders.

FIG. 9B shows a flow chart of a method 905 for retrofitting a conventional double-hull cargo transport vessel 10 to form a complete integral tank double-hull cargo containment vessel 20. In method 905, the existing topside deck 120 of the conventional double-hull cargo transport 10 will become part of the secondary hull of the complete integral tank double-hull cargo containment vessel 20. In step 915, a topside deck 120 of a conventional double-hull cargo vessel 10 may be removed. In step 925, a heat exchanger 270 may be disposed in the conventional double-hull cargo transport vessel 10. In step 935, one or more heating coils may be disposed in one or more of the containment tanks. In step 945, the topside deck 120 may be reinstalled as topside structural member 240 forming part of the secondary hull. In step 955, one or more cargo containment tanks may be fabricated using structural members of the secondary hull. In step 965, a topside structural member 220 may be fabricated as part of a primary hull to form complete integral tank double-hull cargo containment vessel 20. In some embodiments, steps 915 and 945 may be optional. In some embodiments, steps 925 and 935 may be performed after step 945.

Figure 10:
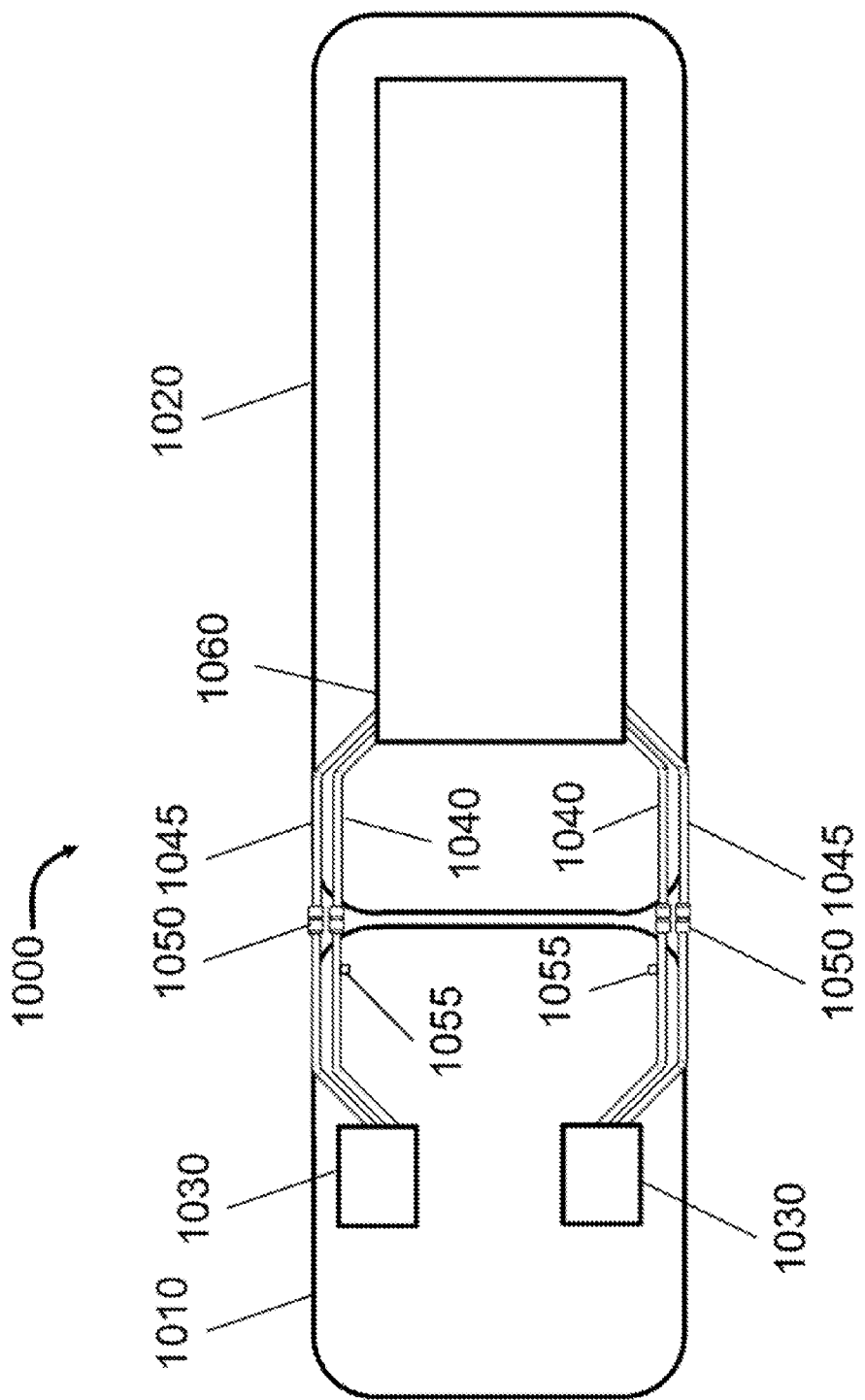
FIG. 10 shows a two vessel system for heating a hot cargo on the second vessel using heat from the first vessel in accordance with one or more embodiments of the present disclosure.

FIG. 10 shows a schematic of a system 1000 for heating a hot cargo on one watergoing vessel using a heat source on another watergoing vessel according to one embodiment of the present disclosure. The system 1000 may include a first watergoing vessel 1010 and a second watergoing vessel 1020. The first watergoing vessel 1010 may be configured to provide propulsion. The first watergoing vessel 1010 may be a tug boat or a push boat. The second watergoing vessel 1020 may be barge. In some embodiments, the second watergoing vessel 1020 may be, but is not limited to, the conventional cargo vessel 10 or the integrated double-hull cargo containment vessel 20.

A heat system 1030 may be disposed on the first watergoing vessel 1010 and configured to transfer heat through a heat transfer fluid. The heat transfer fluid may be carried between the first watergoing vessel 1010 and the second watergoing vessel 1020 over a heat transfer connector, such as discharge umbilicals 1040 and return umbilicals 1045. Each umbilical 1040, 1045 may be configured to carry a heat transfer fluid of sufficient temperature to heat the hot cargo being transported on the second watergoing vessel 1020.

The each paired set of discharge umbilicals 1040 and the return umbilicals 1045 may each include a pressure sensor 1055 configured to indicate a sudden loss of pressure, such as when one of the umbilicals 1040, 1045 is disconnected while operating under pressure. While shown as a pair of discharge umbilicals 1040 and a pair of return umbilicals 1045, this is exemplary and illustrative only, as the number of and positioning of the discharge umbilicals and return umbilicals relative to one another may be varied as would be understood be a person of ordinary skill in the art. The pressure sensor 1055 may provide a signal to a quick disconnect fitting 1050 configured to prevent or minimize fluid loss when one of the umbilicals 1040, 1045 is disconnected.

The umbilicals 1040, 1045 may be routed to a hot cargo heating system 1060 disposed on the second watergoing vessel 1020. The hot cargo heating system 1060 may include a hot cargo storage volume, such as the cargo carrying volume 221 shown in FIG. 2B. The storage volume may be uniform or separated into individual tanks, such as the tanks 260. As shown, the first watergoing vessel 1010 and the second watergoing vessel 1020 are adjacent; however, this is exemplary and illustrative only, as other configuration may be used, such as disposing a non-hot cargo watergoing vessel (not shown) between the first watergoing vessel 1010 and the second watergoing vessel 1020, wherein the umbilicals 1040, 1045 are extended along the length of the non-hot cargo watergoing vessel to reach the second watergoing vessel 1020. In some embodiments, the weight of the umbilicals 1040, 1045 and the heat transfer fluid therein may be supported by the non-hot cargo watergoing vessel.

Figure 11:
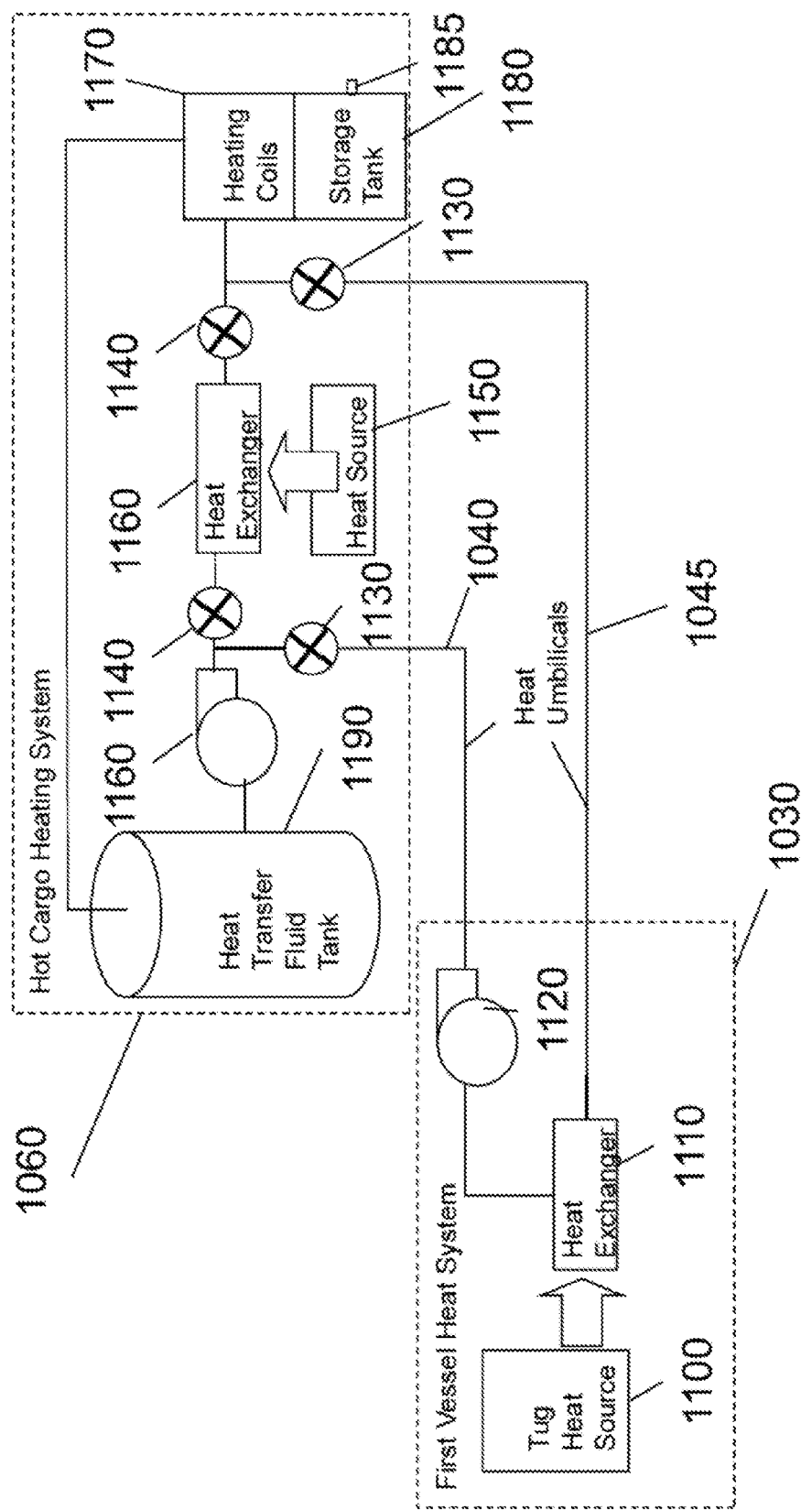
FIG. 11 shows a schematic of the heat flow for the system of FIG. 10 in accordance with one or more embodiments of the present disclosure.

FIG. 11 shows a schematic of the heat transfer in system 1000. The heat system 1030 on the first watergoing vessel 1010 includes a heat source 1100. Heat from the heat source 1000 may be collected by a heat exchanger 1110 and circulated through the discharge umbilical 1045 to the hot cargo heating system 1060 disposed on the second watergoing vessel 1020. The heat source 1100 may include, but is not limited to, one or more of: i) the propulsion system of the first watergoing vessel 1010, ii) the exhaust heat of the propulsion system of the first watergoing vessel 1010, and iii) a non-propulsion heat generating unit. The circulation of the heat transfer fluid may be assisted by a pump 1120.

A set of valves 1030 may be configured to allow the heat transfer fluid to circulate in a loop in the hot cargo heating system 1060 to a heat exchanger 1170, such as a set of heating coils, which are configured to transfer heat from the heat transfer fluid to a storage tank 1180. The heating exchanger 1170 may be of a suitable configuration for heating hot cargo, including, but not limited to, the coils 265 shown in FIG. 6A. The storage tank 1180 may be of a suitable configuration for storing hot cargo, including, but not limited to, one or more of the storage tank 272 and the storage tank 273.

The hot cargo heating system 1060 may include a pump 1160 configured to circulate the heat transfer fluid. The hot cargo heating system 1060 may also include a heat transfer fluid storage tank 1190. In some embodiments, the hot cargo heating system 1060 may include its own, optional, heat source 1150 and heat exchanger 1160 that are configured, along with valves 1040 and valves 1030, to allow the hot cargo to be heated from the heat source 1100 or, in the alternative, the heat source 1150. In some embodiments, a temperature sensor 1185 may be disposed in thermal communication with either the storage tank 1180 or the heating exchanger 1170 and configured to send a control signal to the valves 1030, 1040 to switch between which heat source 1100, 1150 is used to heat the hot cargo.

Figure 12:
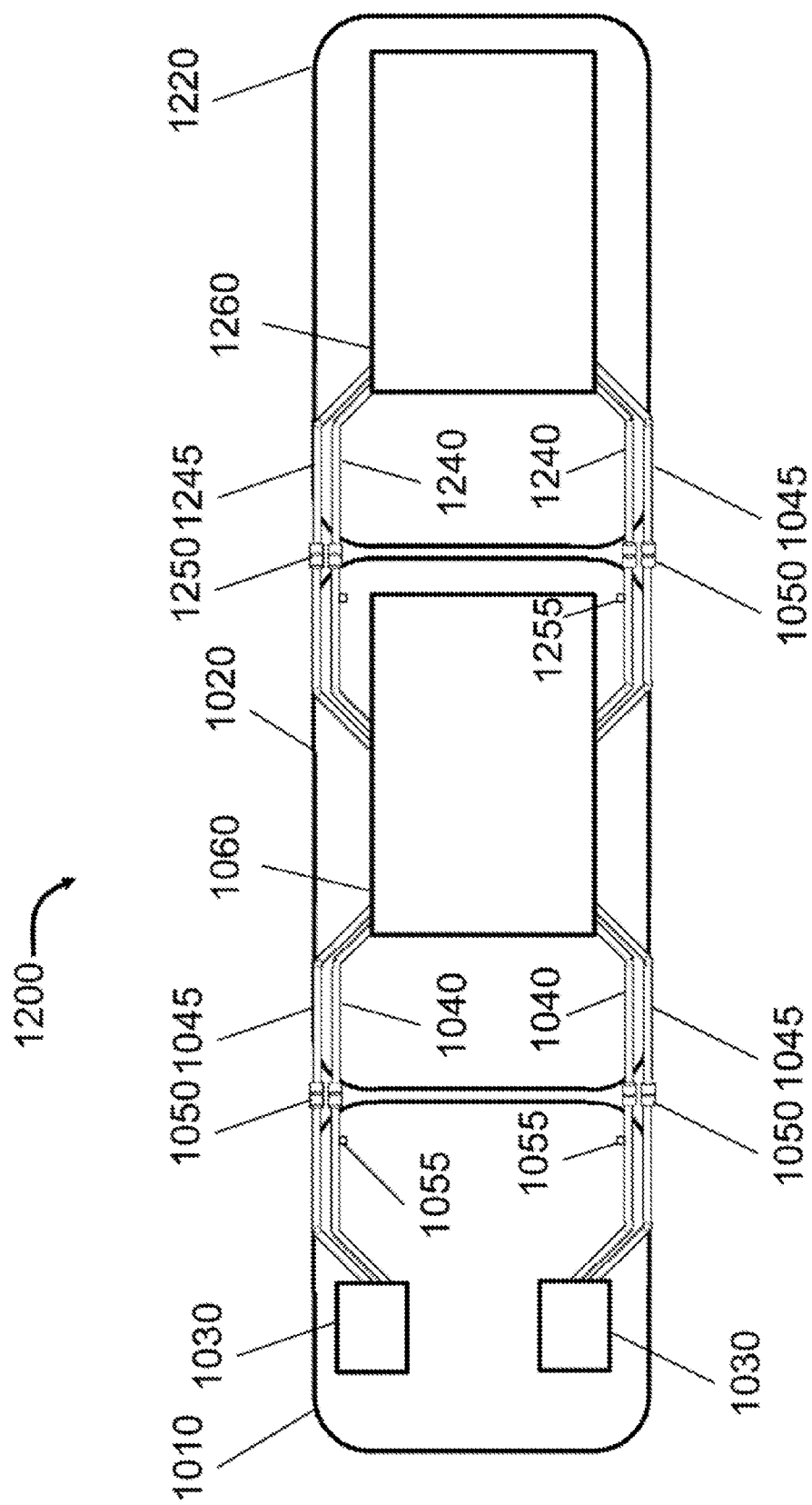
FIG. 12 shows a three vessel system for heating a hot cargo using a heat source on a non-hot cargo carrying vessel in accordance with one or more embodiments of the present disclosure.

FIG. 12 shows a system 1200 for heating hot cargo according to another embodiment of the present disclosure. System 1200 includes the first watergoing vessel 1010, the second watergoing vessel 1020, and a third watergoing vessel 1220 that is configured to store and heat hot cargo. The system 1200 may also include a suitable heat transfer connector, such as discharge umbilicals 1240 and return umbilicals 1245. The each paired set of discharge umbilicals 1240 and the return umbilicals 1245 may each include a pressure sensor 1255 configured to indicate a sudden loss of pressure, such as when one of the umbilicals 1240, 1245 is disconnected while operating under pressure. While shown as a pair of discharge umbilicals 1240 and a pair of return umbilicals 1245, this is exemplary and illustrative only, as the number of and positioning of the discharge umbilicals and return umbilicals relative to one another may be varied as would be understood be a person of ordinary skill in the art. The pressure sensor 1255 may provide a signal to a quick disconnect fitting 1250 configured to prevent or minimize fluid loss when one of the umbilicals 1240, 1245 is disconnected. The umbilicals 1240, 1245 may be routed to a hot cargo heating system 1260 disposed on the third watergoing vessel 1220. The hot cargo heating system 1260 may include a hot cargo storage volume, such as the cargo carrying volume 221 shown in FIG. 2B. The storage volume may be uniform or separated into individual tanks, such as the tanks 260.

As shown, the heat transfer fluid is circulated to the second watergoing vessel 1020 and then to the third watergoing vessel 1220; however, this configuration is exemplary and illustrative only, as the system 1200 may be configured to circulate the heat transfer fluid to the hot cargo heating system 1260 without first going though the hot cargo heating system 1060, as would be understood by a person of ordinary skill in the art with the benefit of the present disclosure.

Figure 13:
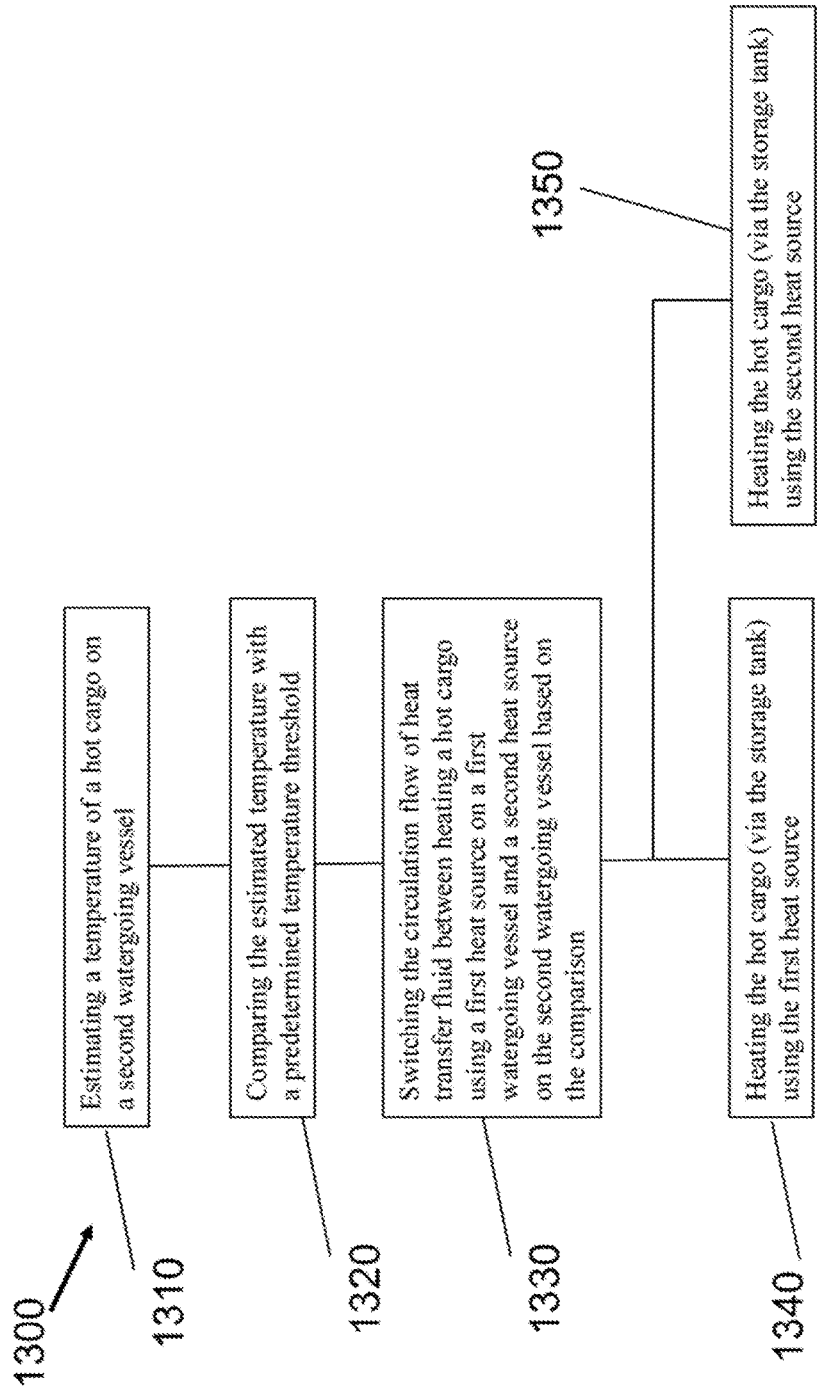
FIG. 13 shows a method of heating a hot cargo in accordance with one or more embodiments of the present disclosure.

FIG. 13 shows a flow chart of a method 1300 for heating a hot cargo according to one embodiment of the present disclosure. In step 1310, a temperature of a hot cargo is estimated using the temperature sensor 1185. In step 1320, the estimated temperature is compared with a predetermined temperature threshold. In step 1330, the flow of the heat transfer fluid, heated by either the first heat source 1100 or the second heat source 1150 is switched between the first heat source 1100 and the second heat source 1150 based on the result of the comparison. In step 1340, if the comparison indicated heating using the first heat source 1100, then the hot cargo is heated using the first heat source 1100. In step 1350, if the comparison indicated heating using the second heat source 1150, then the hot cargo is heated using the second heat source 1150. In some embodiments, steps 1210-1230 and 1250 are optional.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of heating a cargo, the method comprising:
heating a storage tank on a second watergoing vessel using a first energy source on a first watergoing vessel, wherein the storage tank is configured for cargo, and wherein i) the energy source is in communication with a first exchanger on the first watergoing vessel, ii) the first exchanger is in communication with a energy transfer connector configured to circulate a transfer fluid between the first exchanger and a second exchanger disposed on the second watergoing vessel, and iii) the second exchanger is in communication with the storage tank.

2. The method of claim 1, wherein the second watergoing vessel has a second energy source configured to heat the storage tank via the heat fluid,
the method further comprising:
switching a circulation flow of the transfer fluid between receiving energy from the second energy source and receiving energy from the first energy source.

3. The method of claim 2, further comprising:
estimating a temperature of the hot cargo using a temperature sensor, wherein the switching of the circulation flow is based on a signal from the temperature sensor.

4. The method of claim 3, wherein the temperature sensor is in communication with at least one of: i) the storage tank and ii) the second exchanger.

5. The method of claim 1 wherein the watergoing vessels are underway.

6. The method of claim 2, wherein the first source and the second source are heat sources.

7. The method of claim 4, wherein the first exchanger and the second exchanger are heat exchangers.

8. The method of claim 4 wherein the watergoing vessels are underway.

* * * * *